(12) United States Patent
Jacquemot et al.

(10) Patent No.: US 7,263,699 B2
(45) Date of Patent: Aug. 28, 2007

(54) PREPARATION OF A SOFTWARE CONFIGURATION USING AN XML TYPE PROGRAMMING LANGUAGE

(75) Inventors: Christian Jacquemot, Saint Germain les Corbeil (FR); Laurent Latil, Castanet-Tolosan (FR); Vadim Abrossimov, Paris (FR)

(73) Assignee: Sun Microsystems, Inc., Santa Clara, CA (US)

( * ) Notice: Subject to any disclaimer, the term of this patent is extended or adjusted under 35 U.S.C. 154(b) by 796 days.

(21) Appl. No.: 10/171,089

(22) Filed: Jun. 13, 2002

(65) Prior Publication Data

US 2004/0003388 A1 Jan. 1, 2004

Related U.S. Application Data

(63) Continuation of application No. PCT/IB99/02003, filed on Dec. 15, 1999.

(51) Int. Cl.
*G06F 9/445* (2006.01)
(52) U.S. Cl. .................. 717/174; 717/114; 717/175
(58) Field of Classification Search ............. 717/137, 717/174, 140, 110, 120, 175, 114
See application file for complete search history.

(56) References Cited

U.S. PATENT DOCUMENTS

| 5,497,492 | A | 3/1996 | Zbikowski et al. |
|---|---|---|---|
| 5,822,565 | A | 10/1998 | DeRosa, Jr. et al. |
| 5,953,526 | A * | 9/1999 | Day et al. .................... 717/108 |
| 5,970,490 | A * | 10/1999 | Morgenstern ................. 707/10 |
| 6,012,098 | A * | 1/2000 | Bayeh et al. ................ 709/246 |
| 6,083,276 | A * | 7/2000 | Davidson et al. ........... 717/107 |
| 6,292,941 | B1 | 9/2001 | Jollands |
| 6,297,127 | B1 | 10/2001 | Chen et al. |
| 6,681,392 | B1 | 1/2004 | Henry et al. |

OTHER PUBLICATIONS

Robert Eckstein, XML Pocket Reference, Apr. 2001, O'Reilly, 2nd Edition, section 1.5, 12 pages.*
Eckstein, "XML Pocket Reference", Oct. 1999, O'Reilly, First Edition (12 pages extracted). [Online] [Retrieve from] <http://safari.oreilly.com/1565927095>.*
UNIX at Fermilab, Chapter 17: The make Utility, Apr. 1998 (19 pages). [Online] [Retrieved at] <www.fnal.gov/docs/UNIX/unix_at_fermilab/htmldoc/rev1997/uatf-110.html>.*

* cited by examiner

*Primary Examiner*—Tuan Dam
*Assistant Examiner*—Thuy Dao
(74) *Attorney, Agent, or Firm*—Robert C. Kowert; Meyertons, Hood, Kivlin, Kowert & Goetzel, P.C.

(57) ABSTRACT

Configuring software for a target comprises preparing a command file which specifies a subset of components selected from a group of components, and parameters for tuning at least some of the selected subset of components. The command file is written using a single programming language, capable of managing tree structures of objects, preferably an XML type language, having a Document Type Definition enabling it to work as a programming language. An image file is prepared from the command file, to be loaded on the target.

26 Claims, 5 Drawing Sheets

PREPARATION OF A SOFTWARE CONFIGURATION USING AN XML TYPE PROGRAMMING LANGUAGE

This application is a continuation of PCT patent application no. PCT/IB99/02003, titled "Preparation of a Software Configuration Using an XML Type Programming Language", filed Dec. 15, 1999.

BACKGROUND OF THE INVENTION

This invention relates to computer technology.

The operating system (OS) named ChorusOS™ ("ChorusOS" as used herein is a trademark of SUN MICROSYSTEMS, INC.) is a realtime embedded OS, flexible as to the hosting hardware. This implies that it has to be installed and configured on a variety of computer platforms.

For being installed on a particular machine ("target"), ChorusOS has to be configured, i.e. prepared depending upon the target characteristics, and the application software to be supported. After the preparation, the size of the program code may range from 10 kilobytes for a portable machine to several megabytes for a telecom switch, for example.

SUMMARY OF THE INVENTION

Existing versions of ChorusOS use a palette of different programming tools to enable the selection of the desired elements of ChorusOS for a particular target, and for adapting the same to that target, as needed. More precisely, different specific languages were used for "tuning" the configuration, for defining features thereof, and also for defining the memory layout thereof. Generally, discussions are made in this application in the context of ChorusOS, but the present invention is widely applicable across other systems.

This invention intends to improve the preparation of a software configuration for a given machine or target.

One object of this invention is to provide a single programming language common for substantially all steps of the preparation of a software configuration.

Another object of this invention is to provide such a single programming language in a form which is simple, standard and flexible in use, preferably as an implementation of the eXtensible Markup Language (XML).

A further object of this invention is to enable the construction of a hierarchically organized tree of data representing the software configuration.

Still another object of this invention is to enable the preparation of a software configuration to be made on a dedicated machine, with the help of a Graphic User Interface (GUI).

There is proposed a method of configuring software for a target, comprising:
a. preparing commands which specify:
   a1. a subset of components selected from a group of components,
   a2. parameters for tuning a least some of the selected components in said subset, and
b. preparing an image file from the command file.

The above method is of particular interest in providing cross-platform compatibility, in accordance with the invention.

According to an aspect of this invention, step a. comprises writing the commands in a command file using a single programming language, capable of managing tree structures of objects. Preferably, the command file is an XML file, and the single programming language is specified using an XML document type definition, having at least one nestable element predefined to receive an attribute pointing on a file. Other features of the XML document type definition will be defined hereinafter.

Advantageously, the command file and image file are prepared on a host system separate from the target. Then, preferably, step a) further comprises: a3. loading the subset of components on the target. For target operation, the method further comprises the step c. of loading the image file in the target.

Minimally, the image file includes at least an operating system kernel. It may also include an operational file system. Preferably, the image file also defines parameters, actions, and memory layout of the software.

According to another aspect of this invention, step b. comprises:
   b1. preparing a make file from said command file, and
   b2. building said image file using said make file.

The invention also encompasses a computer program product, comprising the group of components of step a1., the code of the XML document type definition in claim 2, and the code for implementing step b, or portions of these codes usable in a commercially available software environment. The computer program product may further comprise code for implementing step a3, and/or code for implementing step c.

Still in another aspect of this invention, there is provided a system for configuring software for a target, comprising a host having
a. A group of components;
b. Software for preparing a command file which specifies
   b1. a subset of components selected from the group of components,
   b2. parameters for tuning at least some of the selected subset of components,
   b3. loading of the subset of components on the target, said software using a single programming language, capable of managing tree structures of objects,
c. Software for preparing an image file, and
d. A link for loading the image file and the selected subset of components in the target.

The above system is subject to additional features similar to those enunciated on the basis of the method.

This invention also covers a command file from which an image file for a target can be prepared, the command file specifying
   a. a subset of components selected from a group of components,
   b. parameters for tuning at least some of the selected subset of components,
   c. loading of the subset of components on the target.

This invention further covers a computer program product comprising a computer-readable medium, having a command file from which an image file for a target can be prepared, the command file specifying
   a. a subset of components selected from a group of components,
   b. parameters for tuning at least some of the selected subset of components,
   c. loading of the subset of components on the target.

This invention still further covers the combination of the command file with the corresponding image file.

BRIEF DESCRIPTION OF THE DRAWINGS

Other characteristics and advantages of the invention will appear in the light of the detailed description below and the associated drawings in which.

Additionally, features of the new language used in this invention (ECML) are defined in Exhibits I and II; Exhibit III shows a portion of an ECML configuration file.

Making reference to a language also imposes certain conventions in notation. In the detailed description:
- the quote sign " is used as character string delimiter wherever deemed necessary for clarity (e.g. "TITLE" hereinafter),
- where the language name is an abbreviation of the current name, square brackets frame the rest of the current name (e.g. ENUM[eration] hereinafter).

DETAILED DESCRIPTION

Existing versions of ChorusOS are defined in "Sun Embedded Workshop, ChorusOS Technical Overview", CS/TR-96-119, SUN MICROELECTRONICS, Palo Alto, Calif. 94303, USA.

An instance of the ChorusOS operating system always includes the core executive component of ChorusoS. Optional components in the operating system provide additional services. The following list of such services is not meant to be complete, as other services may be provided:
Actor Management
Scheduling
Memory Management
Proxy Management
Inter-thread communication
Time Management
Inter-process communication
Local Access Points (LAP)
Debugging
Initialization and command interpreter (C_INIT)
File System Options
I/O Management
Networking
Administration.
Graphic user interface (GUI).

These optional components can be added to, or removed from, an instance of the ChorusOS operating system. In this way, the operating system can be very finely tuned to meet the requirements of a given application or environment.

Each API (Application Programming Interface) function in the ChorusOS operating system is contained in one or more of the configurable components. As long as at least one of these components is configured into a given instance of the operating system, the function is available to be called. However, certain pure library functions are independent of any specific component and are always available.

Figure 1:
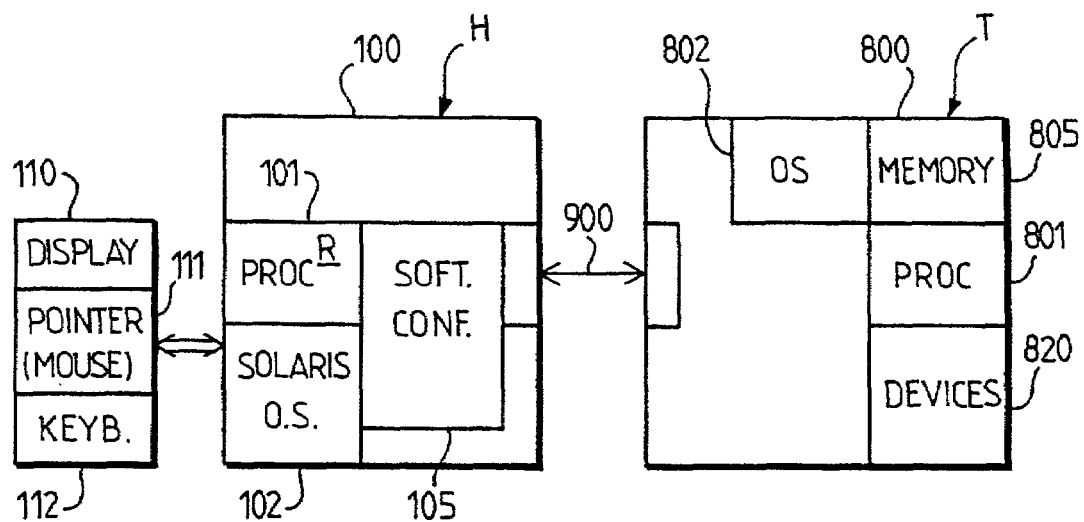
FIG. 1 is a general diagram of two computer stations in which this invention is applicable.

In FIG. 1, target T is the computer intended to receive ChorusOS. The target board 800 has a processor 801, elementary firmware 802, a memory 805 and peripheral devices 820, which may belong to a custom designed peripheral board. The configuration process concerning the target is performed from a host or installing computer H. The host board 100 has a processor 100, e.g. a SPARC® processor (various SPARC® processors are products of, and the mark SPARC® is a trademark of, SUN MICROSYSTEMS, INC.), an operating system 102, e.g. Solaris® (Solaris® operating systems are products of, and the mark SOLARIS® is a trademark of, SUN MICROSYSTEMS, INC.), a memory 105 (encompassing both working memory and mass memory, i.e. hard disk, where appropriate), and may further include the usual display 110, mouse (or other pointer) 111 and keyboard 112.

An appropriate link 900 is made between the host and the target, under control of firmware commands on the target side.

Figure 2:
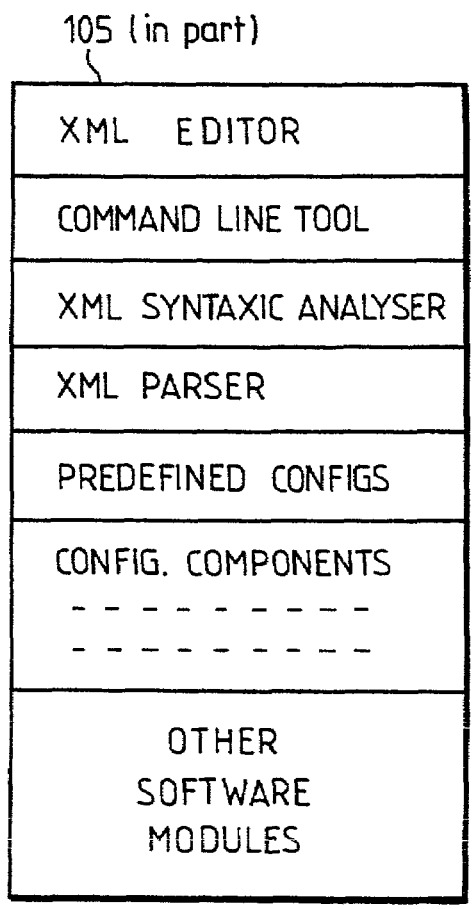
FIG. 2 shows the memory main components in host station 100 of FIG. 1.

As shown in FIG. 2, a portion of memory 105 (RAM or DISK) contains software configuration data, i.e. various software modules serving as tools for the configuration process, or as constituents of the software to be installed.

Figure 3:
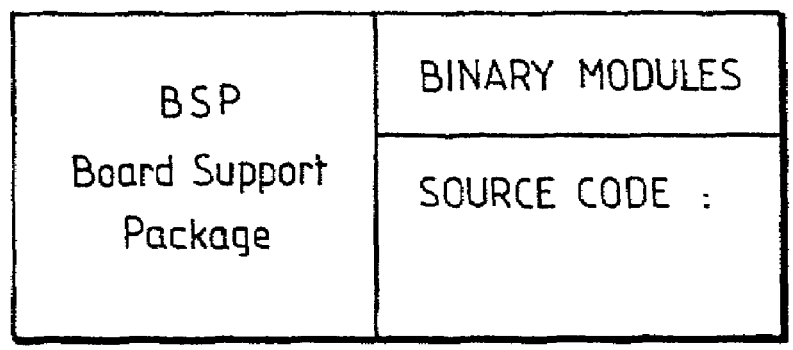
FIG. 3 shows software modules involved in configuring a target station.

Building and configurating such a system requires the selection and configuration of the kernel and operating system generic portions, and also of a processor family dependent portion. Additionally (FIG. 3), it includes the selection and configuration of components defining:
binary modules corresponding to a variety of supported processors and processor architectures,
Board Support Packages (BSP), supplied by the applicant company for a variety of different custom boards,
pieces of code (so-called "drivers") for the board 800, and application software as desired.

Thus, configuring the OS for a particular machine means:
selecting between a light or full version of the OS, with a very large number of intermediate situations,
ensuring coherence of the OS before it may be launched by the OS user.

This configuration and build process encompasses providing a variety of information ranging from the selection of OS modules to the definition of the memory layout of the deployed system on the target.

Concretely, the primary result of the configuration process is an "image file" (also termed "archives"). When installed on the target machine (e.g. in epROM or flash memory), the image file is capable (after suitable initialization, like rebooting) to have it operate consistently in the desired hardware and software configuration.

Figure 5:
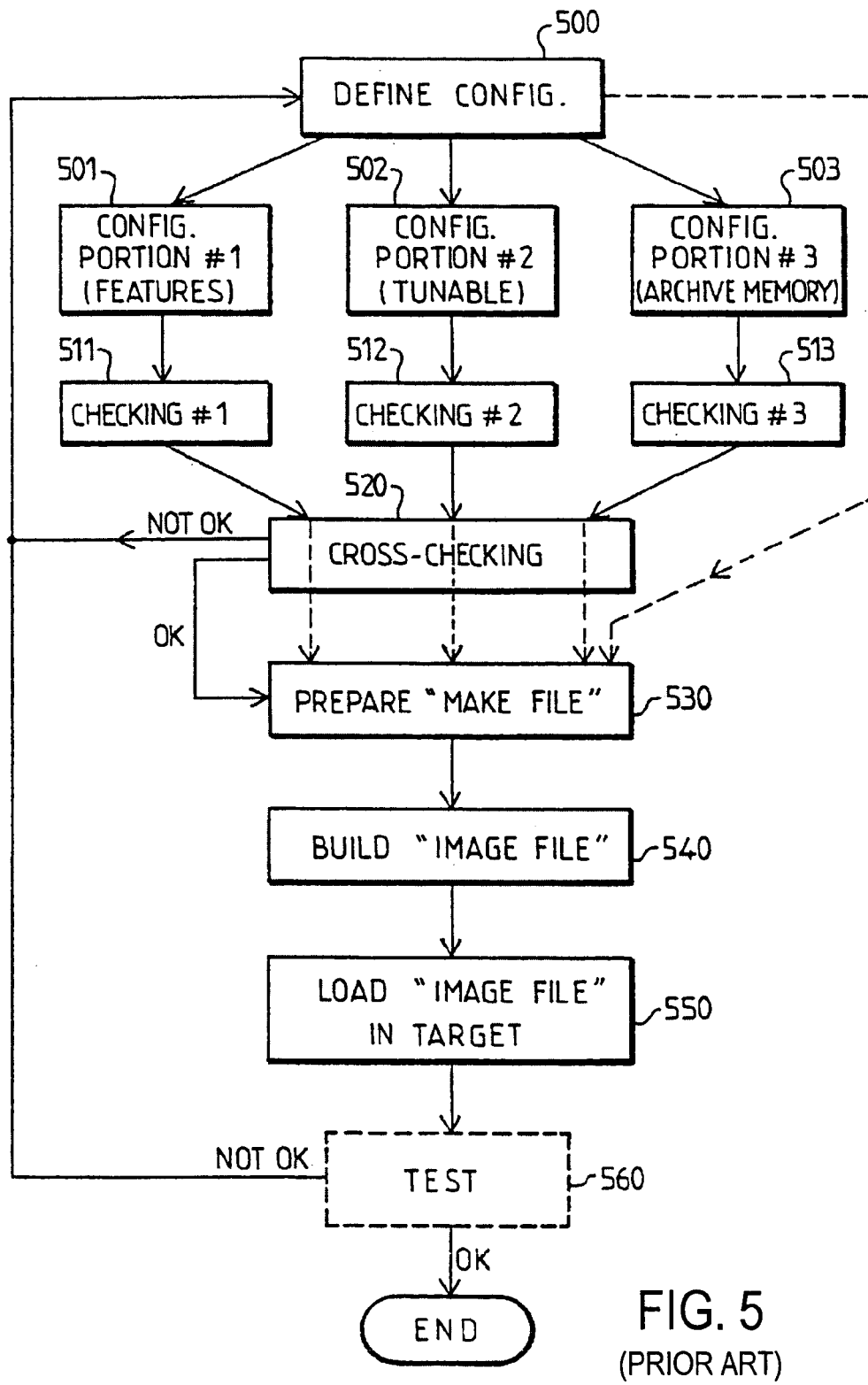
FIG. 5 is a flow chart showing the main steps of the configuration process, as implemented before this invention.

FIG. 5 shows diagrammatically the configuration process as used in previous versions of ChorusOS. Defining the configuration (500) is split into defining different portions of the configuration, 501 for the "features", 502 for the "tunable", 503 for the "archive memory layout" (these concepts will be defined later), etc. The portions are individually checked in 511, 512, 513, etc. Then, they are cross-checked in 520. If the checking is not entirely satisfactory, the whole process has to be resumed (except where the error is restricted to very few things, which the operator can identify and correct). Multiple languages and configuration tools were used to handle this diversity of information. Each aspect of the configuration is covered by a specific language and tool. On the one hand, this approach leads to the specialization of each language and tool to its own domain, resulting into simple syntax, and simple tools. On the other hand, it is difficult to share information between tools, and to take into account new types of information. This implies a sophisticated mechanism to bind all the tools together.

If the checking is satisfactory, a "make file" is prepared (530), using the various portions of configuration having been prepared. The "make file" is an ordered and coherent list of operations to be made to obtain an image file at 540. The image file is then loaded on the target (550), and, usually, tested (560). Again, the test may result into resuming the whole process.

There is a current trend towards a binary model (delivery of software modules in binary form). It increases the complexity of the configuration process. As time goes, more and more component providers (board support packages, drivers and so forth) are required to obtain a running system. This puts more emphasis on the specification of configuration data. Furthermore, to reduce the complexity of the configuration process, graphical tools should be developed to complement command line tools.

In the present invention, the following new capabilities are sought:

The applicant company provides Board Support Packages (BSP) for a number of peripheral boards available from various independent hardware vendors. It has been found desirable to supply the BSPs in a form which comprises binary code dedicated to the board itself, and source code for the platform dependent portions of the BSP, e.g. Application Program Interfaces or APIs.

distinguishing between programming APIs (e.g. in Posix), and configuration APIs. Configuration is here intended to be understood in a very generic fashion, i.e. all the information that is not purely programming API and that is required to build the target system and adapt it to a specific hardware and to a specific usage.

Accordingly, in the present invention, configuration will cover:

feature configuration, i.e. the appropriate subset of components required in the system, e.g. scheduling classes, memory management support, tunable configuration, e.g. specific system values, number of threads in the kernel, size of communication buffers, memory layout of the various components of the system, driver properties, third party application configuration.

In accordance with an aspect of this invention, a single configuration programming language has been designed for processing such folders as objects. Preferably, this single configuration programming language is based on the XML language standard, and named "Embedded Component Markup Language" (ECML).

XML (for eXtensible Markup Language) is a recent hypertext metalanguage standard, specified by the XML working group. For understanding the XML aspects of this invention, reference is made to the XML recommendations, available on the INTERNET at http ://www. w3.

The basic markup principle of XML is as follows:
let "TITLE" be a selected character string,
in the corresponding XML document, what is between "<TITLE>" and "</TITLE>" is an "element",
a Document Type Definition (DTD) determines what that element may contain (including other nested elements), and its attributes.

Until now, XML proposals have been essentially text-based. Thus, an XML parser will read the DTD and the XML file, and use the markups to trigger actions referred to the XML document itself: e.g. print "TITLE" and "AUTHOR" in different font sizes.

By contrast, the newly proposed ECML language is intended to be a programming language. This raises new problems, since the actions being triggered by the program will be external to the XML document itself. However, as it will be seen, ECML considerably simplifies the configuration and building process of ChorusOS based systems.

The DTD for ECML is given in Exhibit I. A DTD has the same markup principle as XML itself, however with slightly different syntax rules, and reserved words like #PCDATA. The DTD expressions are enclosed between "<!XXXXX" and ">", where "XXXXX" is a keyword, e.g. "ELEMENT", and the rest is a name, followed with one or more other arguments. The expressions are case-sensitive. The DTD provides a formal definition of the elements with <!ELEMENT . . . . .> and of their attributes, with <!ATTLIST . . . . .>), together with the relationship among the data elements. An <!ENTITY #. . . . .> clause builds a parameter entity for internal use in the DTD. Finally, comments are enclosed between "<!- -" and "- ->" markups. The comments have been supplemented with alphanumeric identifiers, for purpose of description. In Exhibit I:

sections A1 and A2 prepare entities for the DTD, defining what a "container" and a "content" will be.

sections B uses the "container.mdl" and "content.mdl" entities to define the element "configuration" and its attributes, while defining further entity "config.mdl".

section C uses the "container.mdl" and "content.mdl" entities to define a further entity "folder.mdl", and prepares elements "folder", and "folderRef".

section D prepares the element "description".

section E defines the entity "type.mdl", while sections E1 through E6 prepares the elements corresponding to various types of variables: "bool", "int", "string", "enum", "struct", "list".

section F defines the entities "boolExpr.mdl" and "expr.mdl", and prepares the elements corresponding to the boolean expressions "and", "or", "not", to the boolean/arithmetic expressions "equal", "notEqual", and to "ifdef".

sections G1 through G5 prepare the elements/attributes for giving a value to a variable, as a constant "true", "false", "const", or by reference to another object "var", "ref", "vstring".

section H defines the entity "field.mdl", and prepares the element "field".

section I prepares the element "condition".

section J defines the entity "definition.mdl", and prepares the element "definition", and the elements "feature" and "tunable", which are directly related to software configuration.

section K defines the entity "setting.mdl", and prepares the element "setting", for assignment of a value to a variable.

sections L and M prepare the elements "constraint" and "parameter".

section N prepares the elements "action" and "application".

section O prepares the element "typeDef", for definable types of variables.

section P prepares the elements "using", "value", and "default".

Exhibit II shows a few examples of program statements using ECML. In the beginning:

II.1.1 and II.1.2 respectively define a boolean variable "my_variable1", set to true, and an integer variable "my_variable2", having the value 1024.

II.1.3 shows how "my_variable1" may be later set to false.

II.1.4 shows how "my_variable4" may be created with the value of "my_variable2".

ECML allows the definition of actions. Each action is characterized by:
- its "name", a string of characters,
- its "application", a string of characters,
- its "parameter", a reference to a defined variable.

Example II.2 defines an action "my_action", associated to the application "my_application", which will be called with the variable "my_variable".

The "action" is the entry point for calling application plugins, while binding these tools to descriptions. When parsing a configuration ECML file, application plugins are called with associated parameters. A description can be optionally associated with an action. The expression is evaluated if there is no condition associated with the constraint or if the condition associated with the constraint evaluates to true. Application processing is tool specific. The "application" element defines the plugin that should be called. The parameter associated with the application can be defined using a local definition or a reference to a defined variable.

Example II.3.1 shows how a new type "my_type" is defined. This type is a structure that contains two fields "my_field1" of type integer and "my_field2" of type boolean. Example II.3.2 illustrates the definition of a variable of type "my_type".

In example II.4, if the variable "my_condition" evaluates to true, the variable "my_variable" will be defined; if the variable "my_condition" evaluates to false, the definition container will not be processed. Generally, ECML allows association of a condition with an element; then, the element is processed if and only if the condition evaluates to true.

In order to check consistency between variables, ECML uses "constraints", each characterized by a boolean expression. In example II.5, if the variable "my_condition" evaluates to true, the constraint is verified. If the variable "my_conditions" evaluates to false the constraint evaluates to false.

Example II.6 shows an AND logical function with variables "my_condition1" and "my_condition2".

ECML provides support to organize the information described through "folder" and "folderRef" elements in a hierarchical manner. The "folder" element is the container element that provides encapsulation of other elements. A "folder" is characterized by its "name", a string of characters. Example II.7.1 defines a folder "my_folder", containing two folders "my_subfolder1" and "my_subfolder2". The "folderRef" element of II.7.2 is the container element that is used to create a reference to another file. The referenced file "filename" is embedded for processing in the body of the folder "my_folder" at the location of the reference. Relative paths are assumed to be relative to the directory containing the file being parsed.

The above reflects the fact that, when using XML, any language element must be then be defined, with its own markups, in contrast with other programming languages. This results some complexity, since e.g. example II.1. needs four lines, in lieu of a program statement often written as follows:

my_variable=TRUE

Despite that complexity, it has been found possible to elaborate an XML based programming language, at least for use in configuring software. Furthermore, this approach has the advantage of providing the program as a fully structured text, in which automatic tools (programs) may later easily and safely fetch any information they require.

Figure 4:
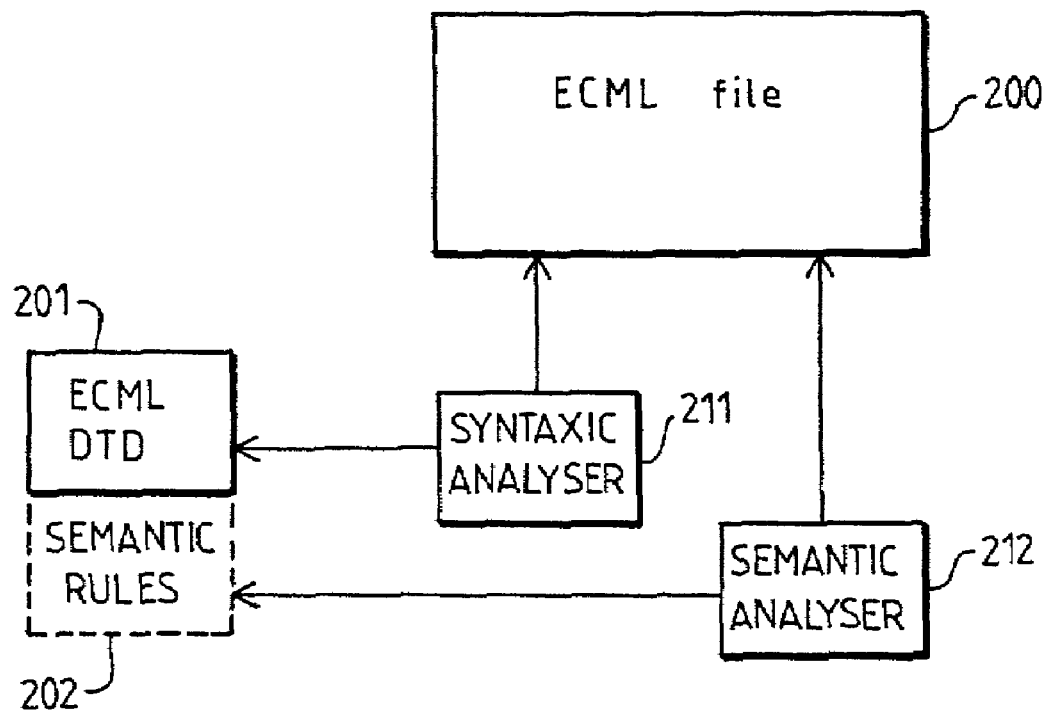
FIG. 4 shows how an ECML file may be submitted to syntactic and semantic analysis.

As shown in FIG. 4, the ECML file may be submitted to a syntactic analyser 211, using the corresponding DTD 201. If desired (for non-developers), it may be submitted to a semantic analyser 212, using a library 202 containing the semantic rules to be applied.

It results from the above description that ECML provides, inter alia, support for:
- defining a variable (integer) with a mechanism (or "trigger") to check its value with respect to a minimum and a maximum;
- defining constraints between variables, using boolean calculus;
- associating the definition of a variable to conditions expressed by other variables;
- later updating of a variable having already be defined;
- managing lists, in the form of an object model;
- organizing the configuration in a hierarchical manner in multiple files;
- organizing the naming space of variables (an XML feature).

Together, these two last mentioned organizing tools permit to cope with the diversity of managed information and the number of component providers.

Thus, according to a basic concept of this invention, all the necessary information or data for the OS configuration is arranged as a tree-structured set of "folders", such that any folder has a parent folder, starting from a head folder. Through "folderRef", a folder may be connected to an independent file. Certain folder files may be modified. This enables the folders to includes files of different origins, which have to be organized for proper operation. Thus, the applicant felt the need for an adequate structured sequential programming language.

An example of a much simplified ECML file will now be described, with reference to Exhibit III:
- Lines 4–6 are the usual XML header, defining the XML version and the applicable DTD.
- Then, line 8 creates a folder "Kernel Configuration", having a "folderRef".
- Lines 11–30 create a [sub] folder "Core Executive", in which the feature "HOT_RESTART" is disabled, the feature "USER_MODE" is enabled, and the feature "ROUND_ROBIN" is disabled.
- Lines 32–60 create a [sub] folder "Kernel core tunables", in which the tunable "chorusSiteId" is set to integer 0, the tunable "kern.exec.maxCpuNumber" is set to integer 1, the tunable "kern.exec.maxActorNumber" is set to integer 64, and the tunable "kern.exec.maxThreadNumber" is set to integer 128.
- Lines 62–80 creates a [sub] folder "Virtual Address Space". It will be processed only if the variable "VIRTUAL_ADDRESS_SPACE" is true. If so, a feature "ON_DEMAND_PAGING" is created, which will be processed only if the variables "VM_available" and "PRM_available" are both true. The feature "ON_DEMAND_PAGING" is set to false.

The configuration process will now be described, using the terminology of ChorusOS. The discussion of ChorusOS is exemplary only, and the invention is not limited to ChorusOS.

Generally, configuring ChorusOS firstly comprises selecting components, using the boolean variables called FEATURES; this results into a LIST of components.

The configuration process comprises three other levels of system configuration:

a) Resources. For the list of selected components of FEATURES, it is possible to fix the amount of resources which are to be managed. This uses variables, representing tasks, buffers, and other parameters for adapting the target system to its own desired configuration (for example a pager needs only a small number of internal OS processes or actors). Some of the variables (the "tunable") are preferably "tuned" to avoid spoiling resources which are of no use in the target as desired. Thus, it is also possible to set the value of those tunable variables, for example, the amount of memory reserved for network buffers. The TUNABLE variables are mostly integer and string variables, but may also be defined using an ENUM[eration] type variable. The TUNABLE may belong to the components themselves, or be various resource (e.g. memory) parameters. They usually are an integer having minimum and maximum values, e.g. to represent the network buffer size, while avoiding meaningless configuration such as a negative value therefor.

b) Boot Actors. It is possible to include additional actors in the memory image that is loaded at boot time. The list management, done in the form of an object model, simplifies significantly the description of a list and reduces the possibility of mistakes. Here, for example, including additional actors in the memory image uses list management: more information must be associated with each actor added into the image such as linking address, actor type, and so forth. This is a refinement of the target image building process done according to this invention.

c) Environment. System-wide configuration parameters can be fixed by setting UNIX-like environment strings, which the operating system and actors retrieve when they are initialized. For example, an IP address can be defined globally by setting LOCAL_INADDR to '192.33.15.18'. This implies allowing for definition and management of variables such as LOCAL_INADDR. In order to check the correctness of the configuration statically, these variables should be typed, possibly with definable types This is monitored by configuration tools, which take care of any hidden dependencies or possible incompatibilities. An element having its "visible" set to "no" serves that purpose.

ECML enables to simply associate the definition of variables to conditions expressed by other variables. This is very useful, since a software configuration largely depends on itself: for example, the Ethernet driver should be tuned if and only if it has been selected. Thus, a "driver_to_be_tuned" boolean variable may be defined from a "driver_selected" boolean condition.

With the ability to define constraints between variables, using boolean calculus, it becomes possible to use a sophisticated rule-engine to check the validity of a configuration. This rule-engine implements boolean calculus on features, based on boolean expressions. This mechanism provides support for checking feature dependencies such as: "Ethernet driver is required by TCP/IP feature".

Figure 6:
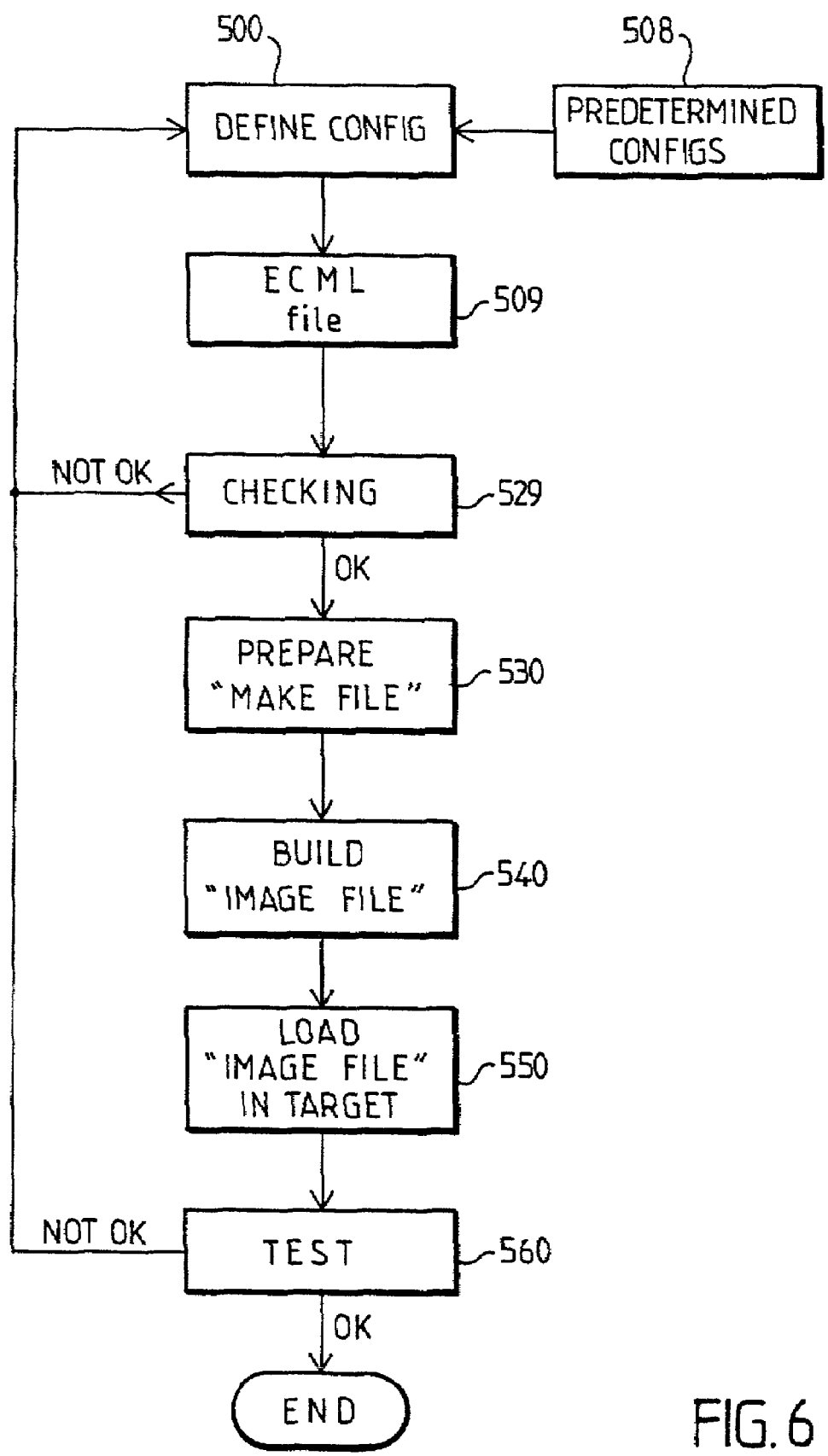
FIG. 6 is a flow chart showing the main steps of the configuration process as implemented in accordance with this invention.

FIG. 6 shows diagrammatically the new configuration process, using ECML. Defining the configuration (500) is now simply writing an ECML file 509, described in further detail below. The checkings reduce to a single step 529, a part of which may be implemented in real time during the ECML file edition. The rest of the steps is similar, however with various significant changes, like the modular structure of the objects or folders being called or used by the make file, and the possibility for the make file execution to interact with the ECML file (not shown in FIG. 6).

Preferably, a set of predefined configurations 508 ("profiles") are provided. The configuration process is then decomposed in two steps:

selection of a predefined configuration. As seen hereinafter, the configuration operator defines the desired configuration using an XML text editor, together with a command line tool and/or a graphical tool, for launching "actions" of the configuration producing system. The "actions" comprise:

designating one or more folder object files or FOF, and checking that the designated FOFs are coherent with previously designated FOFs and between themselves.

modification of the selected configuration, if desired, with the capacity to restore the predefined values. Therefore, ECML and the associated tools provide a mechanism to manage modifications made to the configuration.

Figure 7:
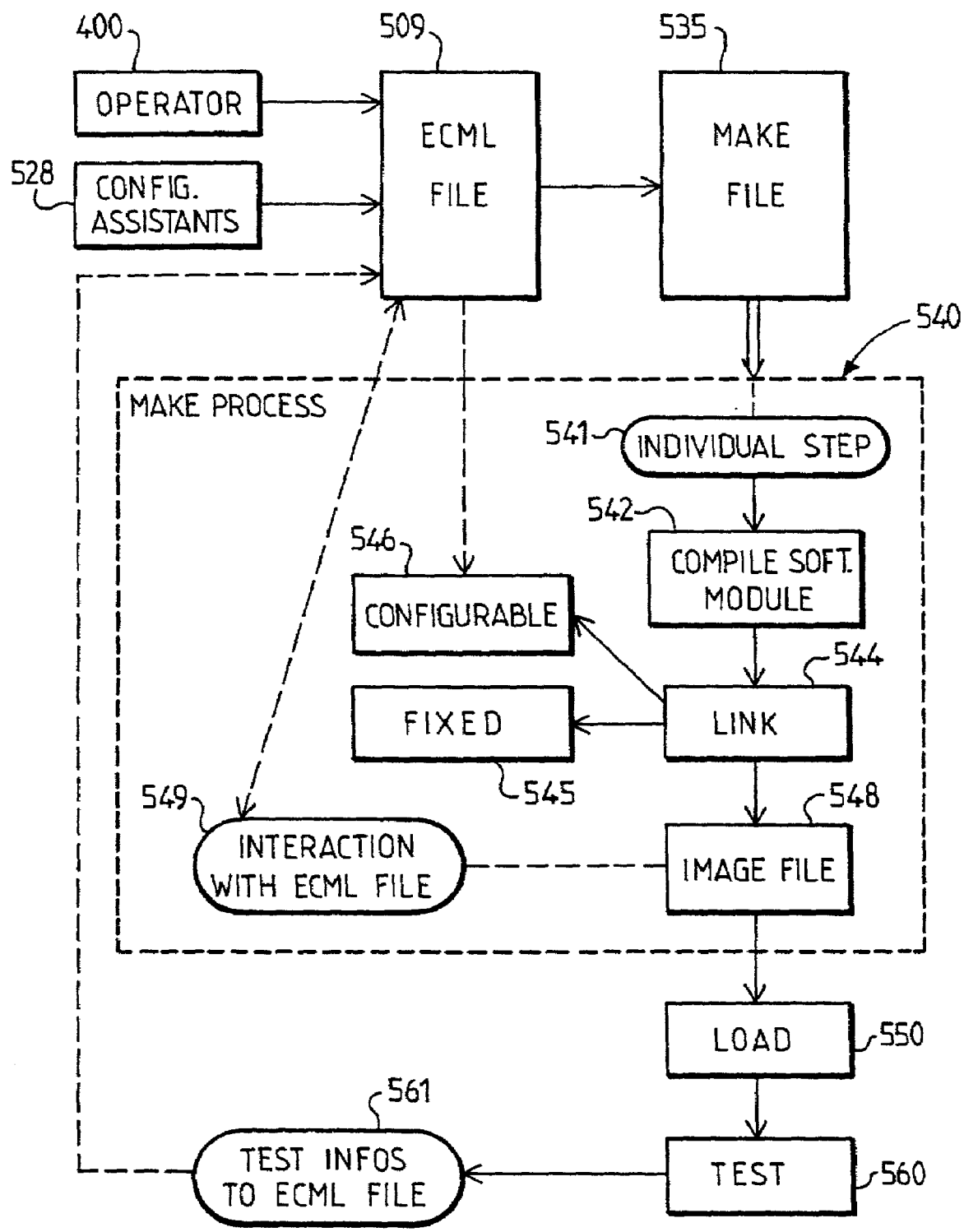
FIG. 7 is a flow chart showing step 540 of FIG. 6 in more detail.

As shown in FIG. 7, the ECML file 509 is written under control of the operator 400, preferably with the help of configuration assistant tools 528.

The information accessible to the configuration operator may not be sufficient to this effect, and the system may also include "hidden" information comprising:

a list of available objects, a list of "tuning" tools defining how those of the objects which are "tunable" may be tuned.

At least at the level of developers (e.g. for the predefined configurations), the ECML file may be edited by using a standard editor, that can be completed with XML specific modes (such as "emacs", a text editor of the GNU).

The ECML file may also be displayed through standard browsers, adapted to work with the XML language. Optionally, the browser may receive extensions to handle XML, in order to complete the graphical tools. Therefore, a translator from ECML to HTML may be included, enabling use of existing graphical tools functions.

As an XML file, an ECML file may be processed or parsed using a software module named "XML processor", enabling access to the data content and to the structure thereof. The parsing may be based on C++ or Java tools, used during the building process of the system. In this description, the XML processor further acts as some kind of program interpreter, for performing the desired steps of software configuration, in the example being described here. Each such step may be executed like a command line (command line mode), or the steps may be piloted using a graphic user interface, i.e. graphical tools, mode targeted to end-users to configure the system.

The basic processing of ECML files in command line mode is split in two phases:

parsing the ECML file, which in turn involves two processes:

XML parsing semantic analysis tool invocation.

The semantic analysis may be made using an XML semantic analyser, taking into account the needs shown in the DTD. If desired, a syntactic analysis may be made using an XML syntactic analyser like JAVA XML sold by the applicant.

The result of the processing is a list of defined variables. A simple interface is provided to browse this list of variables. This interface is used by the tools involved in obtaining configuration information.

ECML integrates easily into a Java graphical tool, which is an additional key evolution to simplify the overall process of building the system, and more easily allows future evolution of configuration information.

FIG. 7 shows on more detail how the image file is built, by applying the make process 540 to the "make file" 535.

Basically, the make file comprises individual steps of action. Each such step 541 fetches a particular software module (a file in the host) which is first compiled at 542, if not already available in binary form.

After compilation, the modules then have to be linked at 544.

In the case 545 of a fixed (invariable) software module, the linking step is direct. For the case 546 of a configurable software module, the linking step will access the ECML file 509, as necessary to obtain the information defining the particular configuration parameters of the software module being linked. This uses the folder organization of the ECML file, and the value(s) in the "TUNABLE" object for the software module being processed. This is another advantage of ECML.

When the image file is finalized at 548, step 549 preferably interacts with ECML file 509, essentially to update it with further information relating to the image file itself, including the future memory layout in the target (as it will be explained in more detail hereinafter). Thus, the ECML file contains not only what is necessary to build the make file, and then the image file, but also information as how the image file is in itself, and may be installed in the target memory. This is still another advantage of ECML, and is of interest for testing purposes. If required, step 549 also defines the additional components, to be loaded by the image file.

Later, a test step 560 may also add debug-oriented information 561 into the ECML file, thus rendering it to be a complete representation of the whole configuration process, including the testing.

In the example of ChorusOs, a module named MKIMAGE enables to make an image file for the target. The system image is the initial state of the target board's physical memory. It contains a set of files organized in one or more memory banks. When the target system is deployed, some of the system image memory banks are burnt into non-volatile physical memory. The rest can be downloaded from a local device or from the network by the initial loader.

More precisely, in the example, the MKIMAGE command builds a binary file called "bootconf", and containing a data structure also called BootConf, which describes the system image contents and layout. MKIMAGE includes the bootconf binary file in one of the system image memory banks. When the target will be started, the initial loader will boot the OS, jumping to the entry point of bootconf binary. In fact, "bootconf" is a board-independent program that gets control from the board-specific initial loader and transfers control to the board-specific bootstrap program. The initial loader may pass a board-dependent parameter to the bootstrap.

Thus, MKIMAGE creates the system image as defined in the ECML configuration file. The configuration may specify a list of memory banks, and, for each particular bank, a symbolic name, a base address, and a size limit. Upon request from the configuration file, MKIMAGE may also organize at least some of the memory banks as a file system volume. The configuration file may also specify a list of files (components) to be included in the system image, and, for each particular file, the bank where the file will be stored. In addition, relocatable files may be processed; for such a file, the configuration may specify how the file may be relocated, when stored in a memory bank.

Accordingly, the configuration file enables to closely describe and visualize the fine organization of the target.

In other words, after the configuration has been entirely defined (509) and checked (529), a succession of processing modules ("tools") may be involved during the process of building an image file (530,540):

a first tool (546) extracts tunable information from the configuration ECML file and generates the appropriate code to implement the tunables;

a second tool (549) builds the appropriate object list, based on the list of components used in the system;

a third tool (548) builds the image file to be downloaded to the target, based on the image description.

It will be seen that the ECML file acts as a common infrastructure between those tools. Each tool uses a subset of the information. Therefore, ECML additionally provides entry points for tools.

This invention also covers the proposed software code itself, especially when made available on any appropriate computer-readable medium. The expression "computer-readable medium" includes a storage medium such as magnetic or optic, as well as a transmission medium such as a digital or analog signal. The software code basically includes the code for use in the configuration process itself. It may also include at least some of the group of software components to be installed. The invention also covers the code (image file) obtained as a result of the configuration process, both alone and in association with one or more corresponding XML files, with or without the corresponding DTD, which may obtained through different channels.

The invention has particular interest in the context of configuring software and similar applications. However, the concepts used in building a programming language from XML have interest in themselves. Thus, these aspects are also covered, inter alia in the form of an XML processor, comprising:

a parser for acquiring at least a portion of an XML type file, and a corresponding document type definition, and an analyser for identifying objects in said portion of said XML type file, said objects comprising variables, values, operations, conditions and commands. Other described features also intervene in enabling an XML type file with a DTD to be used as a program file. The DTD enabling this is also part of the invention, whether presented apart from the XML file, or at least partially incorporated therein.

EXHIBIT I

ECML DTD

```
<!-- A1. Container -->
<!ENTITY % container.mdl
    '(description?,condition?,typeDef*,
    (definition|feature|tunable)*,
    setting*,action*,constraint*)'>
```

EXHIBIT I-continued

```
<!-- A2. Content -->
<!ENTITY % content.mdl '(folder|folderRef)*'>
<!-- B. ChorusOS image config. -->
<!ENTITY % config.mdl '%container.mdl;,%content.mdl;'>
<!ELEMENT configuration (%config.mdl;)>
<!ATTLIST configuration
        name            CDATA           #REQUIRED >
<!-- C. Folder -->
<!ENTITY % folder.mdl '%container.mdl;, %content.mdl;'>
<!ELEMENT folder (%folder.mdl;)>
<!ATTLIST folder
        name            CDATA           #REQUIRED
        visible         (yes|no)        #IMPLIED
        configurable    (yes|no)        #IMPLIED >
<!ELEMENT folderRef EMPTY >
<!ATTLIST folderRef
        xml-link        CDATA           #IMPLIED
        href            CDATA           #REQUIRED
        actuate         (auto|user)     #IMPLIED
        visible         (yes|no)        #IMPLIED >
<!-- D. Elements description -->
<!ELEMENT description (#PCDATA) >
<!-- E. Type -->
<!ENTITY % type.mdl 'bool|int|string|enum|struct|list|type'>
<!-- E1. Boolean constant -->
<!ELEMENT bool EMPTY>
<!-- E2. Integer constant. -->
<!ELEMENT int EMPTY>
<!ATTLIST int
        min             CDATA           #IMPLIED
        max             CDATA           #IMPLIED>
<!-- E3. String -->
<!ELEMENT string EMPTY>
<!ATTLIST string
        kind            (filename|dirname)  #IMPLIED>
<!-- E4. Enumeration -->
<!ELEMENT enum (const+) >
<!-- E5. structures -->
<!ELEMENT struct (field+)>
<!ATTLIST struct
        key             CDATA           #IMPLIED>
<!-- E6. lists -->
<!ATTLIST list
        ref-only        (yes|no)        #IMPLIED>
<!ELEMENT list (%type.mdl;)>
<!-- F. Expression -->
<!ENTITY % boolExpr.mdl
 'var|true|false|and|or|not|equal|notEqual|ifdef|imply|onlyOne'>
<!ENTITY % expr.mdl 'ref|vstring|const|%boolExpr.mdl;'>
<!ELEMENT and           ((%boolExpr.mdl;)+)>
<!ELEMENT or            ((%boolExpr.mdl;)+)>
<!ELEMENT not           (%boolExpr.mdl;)>
<!ELEMENT equal ((%expr.mdl;), (%expr.mdl;))>
<!ELEMENT notEqual      ((%expr.mdl;), (%expr.mdl;))>
<!ELEMENT imply         ((%boolExpr.mdl;), (%boolExpr.mdl;))>
<!ELEMENT onlyOne       ((%boolExpr.mdl;)+)>
<!ELEMENT ifdef EMPTY>
<!ATTLIST ifdef
        name            CDATA           #REQUIRED>
<!-- G. Values -->
<!-- G1. Boolean constants -->
<!ELEMENT true EMPTY>
<!ELEMENT false EMPTY>
<!-- G2. String, integer and enum constants -->
<!ELEMENT const (#PCDATA)>
<!-- G3. Value is given by the var (can be any type) -->
<!ATTLIST var
        name            CDATA           #REQUIRED>
<!ELEMENT var (using)?>
<!-- G4. Reference to a variable -->
<!ELEMENT ref EMPTY>
<!ATTLIST ref
        name            CDATA           #IMPLIED>
<!-- G5. String value. Can reference variables value (enclosed by {name}) -->
<!ELEMENT vstring (#PCDATA)>
<!-- H. Structures fields -->
<!ENTITY % field.mdl 'description?,(%type.mdl;),(%expr.mdl;)?'>
<!ELEMENT field(%field.mdl;)>
<!ATTLIST field
```

EXHIBIT I-continued

```
        name            CDATA           #REQUIRED
        optional        (yes|no)        #IMPLIED
        ref-only        (yes|no)        #IMPLIED>
<!-- I. Condition -->
<!ELEMENT condition (%boolExpr.mdl;)>
<!-- J. Declaration of variables -->
<!ENTITY % definition.mdl    'description?,condition?,(%type.mdl;),default?,
        (%expr.mdl;|value*)?>
<!ELEMENT definition (%definition.mdl;)>
<!ATTLIST definition
        name            CDATA           #REQUIRED
        configurable    (yes|no)        #IMPLIED
        visible         (yes|no)        #IMPLIED
        global          (yes|no)        #IMPLIED >
<!ELEMENT feature (%definition.mdl;)>
<!ATTLIST feature
        name            CDATA           #REQUIRED>
<!ELEMENT tunable (%definition.mdl;)>
<!ATTLIST tunable
        name            CDATA           #REQUIRED>
<!-- K. Variable assignment -->
<!ELEMENT setting (description?,condition?,(%expr.mdl;|value*))>
<!ATTLIST setting
        name            CDATA           #REQUIRED
        visible         (yes|no)        #IMPLIED >
<!-- L. Constraint definition -->
<!ELEMENT constraint (description?, (%boolExpr.mdl;))>
<!ATTLIST constraint
        name            CDATA           #REQUIRED>
<!-- M. Parameter definition -->
<!ELEMENT parameter (%expr.mdl;)>
<!-- N. Action -->
<!ELEMENT action
(description?,condition?,application,(definition|%expr.mdl;))>
<!ATTLIST action
        name            CDATA           #REQUIRED
        visible         (yes|no)        #IMPLIED >
<!ELEMENT application (#PCDATA)>
<!-- O. Definition of types -->
<!ELEMENT typeDef (description?, (%type.mdl;))>
<!ATTLIST typeDef
        name            CDATA           #REQUIRED >
<!ELEMENT type EMPTY >
<!ATTLIST type
        name            CDATA           #REQUIRED
        ref-only        (yes|no)        #IMPLIED>
<!-- P. Member and list access. -->
<!ATTLIST using
        field           CDATA           #IMPLIED
        index           CDATA           #IMPLIED>
<!ELEMENT using (using)?>
<!ELEMENT value (%expr.mdl;|value+) >
<!ATTLIST value
        field           CDATA           #IMPLIED
        index           CDATA           #IMPLIED>
<!ELEMENT default (const|true|false) >
```

EXHIBIT II

ECML Fundamentals - Examples

II.1.1

```
<definition name='my_variable'>
<bool/>
<true/>
</definition>
```

II.1.2

```
<definition name='my_variable2'>
<int/>
<const>1024</const>
</definition>
```

EXHIBIT II-continued

ECML Fundamentals - Examples

II.1.3

```
<setting name='my_variable1'>
<bool/>
<false/>
</setting>
```

II.1.4

```
<definition name='my_variable4'>
<int/>
<var name='my_variable2'/>
</definition>
```

EXHIBIT II-continued

ECML Fundamentals - Examples

II.2

```
<action name='my_action'>
<application>my_application</application>
<var name='my_variable'/>
</action>
```

II.3.1

```
<typeDef name='my_type'>
<struct>
<field name='my_field1'>
<int/>
</field>
<field name='my_field2'>
<bool/>
</field>
</struct>
</typeDef>
```

II.3.2

```
<definition name='my_variable'>
<type name='my_type'/>
<value field='my_field1'>1024</value>.
<value field='my_field2'><true/></value>
</definition>
```

II.4

```
<definition name='my_variable'>
<condition><var name='my_condition'/></condition>
<int/>
<const>1024</const>
</definition>
```

II.5

```
<constraint name='my_constraint'>
<var name='my_condition'/>
</constraint>
```

II.6 Boolean Arithmetic

```
<and>
<var name='my_condition1'/>
<var name='my_condition2'/>
</and>
```

II.7.1

```
<folder name='my_folder'>
<definition>...</definition>
...
<folder name='my_subfolder1'>
...
</folder>
<folder name='my_subfolder2'>
...
</folder>
</folder>
```

II.7.2

```
<folder name ='my_folder'>
...
<folderRef href='filename'/>
...
</folder>
```

EXHIBIT III

Example of a simple ECML file

```
<?xml version='1.0'?>
<!DOCTYPE folder PUBLIC '-//Sun Microsystems//DTD ChorusOS//EN'
'ChorusOS.dtd'>
<folder name='Kernel Configuration'>
    <folderRef href='kern_f.xml'/>
<folder name='Core Executive'>
<feature name='HOT_RESTART'>
```

EXHIBIT III-continued

Example of a simple ECML file

```
    <description>Hot restart support</description>
    <bool/>
    <false/>
</feature>
<feature name='USER_MODE'>
    <description>User mode execution support</description>
    <bool/>
    <default> <true/> </default>
    <true/>
</feature>
<feature name='ROUND_ROBIN'>
    <description>POSIX round-robin scheduling class</description>
    <bool/>
    <false/>
</feature>
<folder name='Kernel core tunables'>
    <tunable name='chorusSiteId'>
    <description>Unique Chorus Site Identifier
        Needs only to be set if not automatically provided to the
        kernel by the board-specific boot.
        WARNING: when set, must be set with different values
        within every boot image dedicated to different target boards
        </description>
    <int/>
    <const>0</const>
</tunable>
<tunable name='kern.exec.maxCpuNumber'>
    <description>Maximum number of processors</description>
    <int/>
    <const>1</const>
</tunable>
<tunable name='kern.exec.maxActorNumber'>
    <description>Maximum number of actors</description>
    <int/>
    <const>64</const>
</tunable>
<tunable name='kern.exec.maxThreadNumber'>
    <description>Maximum number of threads</description>
    <int/>
    <const>128</const>
</tunable>
</folder>
</folder>
<folder name='Memory management'>
<folder name='Virtual Address Space'>
<condition>
    <var name='VIRTUAL_ADDRESS_SPACE'/>
</condition>
<feature name='ON_DEMAND_PAGING'>
    <description>On-demand paging</description>
    <condition>
    <and>
        <var name='VM_available'/>
        <var name='PRM_available'/>
    </and>
    </condition>
    <bool/>
    <false/>
</feature>
</folder>
</folder>
</folder>
```

What is claimed is:

1. A method of configuring software for a target, comprising:

generating a command file, wherein said generating comprises:

determining one or more commands which specify:

a subset of components selected from a group of components of an operating system for the target; and one or more parameters for tuning one or more of the selected components in said subset; and writing said commands in the command file in a single programming language, capable of managing tree structures of objects;

wherein the single programming language is specified using an XML document type definition specifying at least one nestable element predefined to receive an attribute indicating a separate file specifying one or more of the selected components; and generating an image file according to the command file, wherein the image file comprises loadable software for the target.

2. The method of claim 1, wherein said XML document type definition specifies:

a predefined element configured to form a condition, and one or more other elements configured to receive a condition as an attribute, for conditionally processing the other elements.

3. The method of claim 1, wherein said XML document type definition specifies:

a predefined element configured to form a constraint, and one or more other elements configured to receive a constraint as an attribute, for conditionally accepting values of the other elements.

4. The method of claim 1, wherein said XML document type definition specifies a predefined element configured to launch an application with a parameter.

5. The method of claim 1, wherein said XML document type definition specifies predefined feature and tunable elements for adapting the configuration.

6. The method of claim 1, wherein the command file and image file are prepared on a host system separate from the target.

7. The method of claim 1, further comprising:
loading the image file in the target.

8. The method according to claim 7, wherein said loading further comprises loading the subset of components on the target.

9. The method of claim 1, wherein the image file includes at least an operating system kernel and an operational file system.

10. The method of claim 1, wherein the image file defines parameters, actions, and memory layout of the software.

11. The method of claim 1, wherein said generating an image file comprises:
generating a make file from said command file, and
building said image file using said make file.

12. A system for configuring software for a target, comprising a host, wherein the host comprises:
a processor; and
a memory coupled to the processor, wherein the memory comprises program instructions executable by the processor to implement:
a group of one or more components of an operating system for the target;
generating a command file wherein the command file specifies:
a subset of components selected from the group of components;
parameters for turning at least some of the selected subset of components;
information regarding loading of the subset of components on the target;
wherein the command file specifies the subset of components, the parameters and the information regarding loading using a single programming language, capable of managing tree structures of objects;

wherein the single programming language is specified using an XML document type definition specifying at least one nestable element predefined to receive an attribute indicating a separate file specifying one or more of the selected components; and generating an image file according to the command file.

13. The system of claim 12, wherein said XML document type definition specifies:

a predefined element configured to form a condition, and one or more other elements configured to receive a condition as an attribute, for conditionally processing the other elements.

14. The system of claim 12, wherein said XML document type definition specifies:

a predefined element configured to form a constraint, and one or more other elements configured to receive a constraint as an attribute, for conditionally accepting values of the other elements.

15. The system of claim 12, wherein said XML document type definition specifies a predefined element configured to launch an application with a parameter.

16. The system of claim 12, wherein said XML document type definition specifies: predefined feature and tunable elements for adapting the configuration.

17. The system of claim 12, wherein the program instructions are further executable to:
load the image file and the selected subset of components on the target.

18. A tangible, computer readable medium, comprising program instructions computer executable to implement:
generating a command file, wherein in said generating comprises:
determining one or more commands that specify:
a subset of components selected from a group of components of an operating system for the target; and
one or more parameters for tuning at least some of the selected components in said subset; and
writing said commands in the command file in a single programming language, capable of managing tree structures of objects;

wherein the single programming language is specified using a XML document type definition specifying at least one nestable element predefined to receive an attribute indicating a separate file specifying one or more of the selected components; and generating an image file according to the command file, wherein the image file comprises loadable software for the target.

19. The tangible, computer readable medium of claim 18, wherein the XML document type definition specifies:

a predefined element configured to form a condition; and one or more other elements configured to receive a condition as an attribute, for conditionally processing the other elements.

20. The tangible, computer readable medium of claim 18, wherein the XML document type definition specifies:

a predefined element configured to form a constraint; and one or more other elements configured to receive a constraint as an attribute, for conditionally accepting values of the other elements.

21. The tangible, computer readable medium of claim 18, wherein the XML document type definition specifies a predefined element configured to launch an application with a parameter.

22. The tangible, computer readable medium of claim 18, wherein said XML document type definition specifies predefined feature and tunable elements for adapting the configuration.

23. The tangible, computer readable medium of claim 18, wherein the command file and the image file are prepared on a host system separate from the target.

24. The tangible, computer readable medium of claim 18, wherein the program instructions are further executable to implement loading the image file on the target.

25. The tangible, computer readable medium of claim 24, wherein in said loading the program instructions are further executable to implement loading the subset of components on the target.

26. The tangible, computer readable medium of claim 18, wherein in said generating an image file the program instructions are further executable to implement:
 generating a make file from the command file; and
 building the image file using the make file.

* * * * *